Patented Feb. 1, 1944

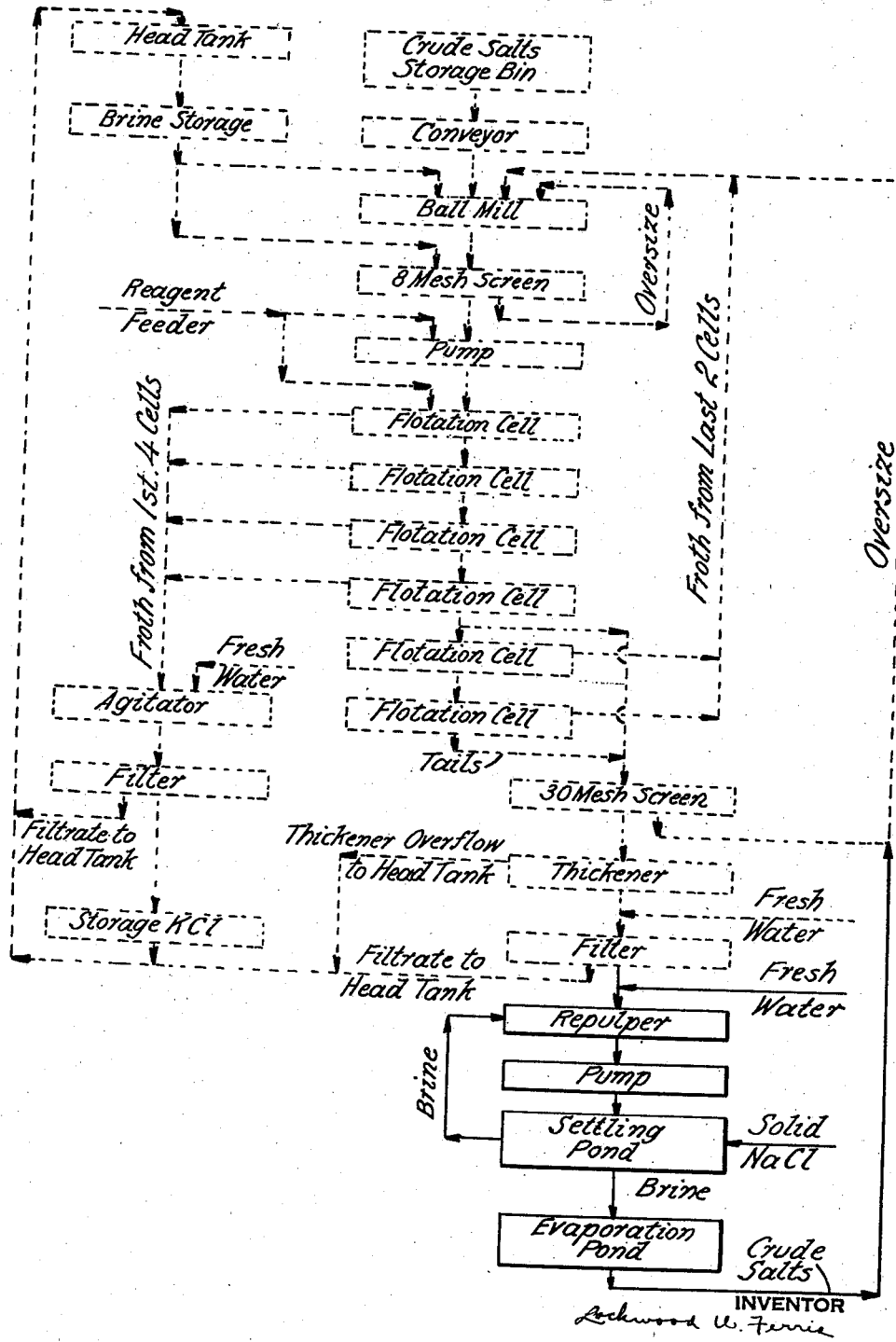

2,340,523

UNITED STATES PATENT OFFICE 2,340,523

METHOD OF TREATING SODIUM CHLORIDE TAILS

Lockwood W. Ferris, Salt Lake City, Utah, assignor to Bonneville Limited, New York, N. Y., a corporation of Delaware Application December 27, 1941, Serial No. 424,571

4 Claims. (Cl. 209—166)

This invention relates to improvements in the separation of potasium chloride from sodium chloride by flotation. The invention provides improvements in such separation which substantially reduce losses of the valuable potassium chloride and reduce the cost of recovering it.

My copending application Serial No. 376,583, filed January 30, 1941, described a method of treating crude salt mixtures of potassium and sodium chlorides involving flotation of potassium chloride and the production of sodium chloride tails in a flotation treatment and this application is a continuation-in-part of my said copending application.

In the flotation of potassium chloride from sodium chloride, with separation of solid sodium chloride in the tails, the tails product, while consisting mainly of sodium chloride, contains substantial amounts of solid potassium chloride. The present invention provides improvements in such flotation procedures by which the potassium chloride in the tails is economically recovered.

In accordance with the present invention, the sodium chloride tails from such a flotation operation is separated from the brine, usually after screening to remove oversize particles for return to the ball mill and separation of undersize particles which are sent to a thickener along with the brine. The solid sodium chloride so obtained contains an appreciable amount of potassium chloride, which, in the practice of the invention, is recovered. The salt is pulped with sufficient water to form a pulp of the proper consistency for pumping, and is pumped to a settling or tails pond in which the solid salt is separated from the brine. This brine is saturated with sodium chloride, but, as considerably more water is required to form a pumpable pulp than is required to dissolve all of the potassium chloride, it is unsaturated with respect to potassium chloride. The brine is recycled to pulp a second batch of tails for pumping to the settling pond, and this circulation of the brine is continued until it is saturated with both sodium and potassium chlorides. The saturated brine is then introduced into an evaporating pond and evaporated to separate out a mixture of potassium chloride and sodium chloride, which, being substantially identical with the initial feed to the flotation apparatus, is supplied with feed to the flotation appartaus. Such operation permits substantial economy in the separation of the two salts, because of the recovery of the substantial amount of potassium chloride heretofore lost in the sodium chloride tails.

The single figure of the accompanying drawing illustrates diagrammatically by means of a flow sheet, a method embodying the invention but the invention is not limited thereto. The flow sheet shows the sequence of operations in a conventional manner, the matter illustrated in broken lines being from the flow sheet of my said copending application reproduced here for convenience to illustrate a complete system in which sodium chloride tails rich in sodium chloride and poor in potassium chloride may be treated for maximum recovery of potassium chloride.

In carrying out a method of the invention, sodium chloride tails containing solid particles of sodium chloride, admixed with or adhering to potassium chloride, are treated with fresh water and circulating brine to dissolve all of the potssium chloride and form a brine saturated in respect to both sodium chloride and potassium chloride. In treating screened sodium chloride tails, water is mixed with the tails to form a pulp of the required consistency for pumping. If fresh water is used, it is necessary to use much more water than is required to dissolve the potassium chloride. Such water, accordingly, does not become saturated with potassium chloride. The resulting solution saturated with sodium chloride and unsaturated with potassium chloride is circulated in a cyclic manner to repulp successive batches of tails until the solution is saturated with respect to both sodium chloride and potassium chloride. The saturated solution is separated from the remaining solid sodium chloride and is evaporated to recover a solid product containing the dissolved sodium chloride and potassium chloride. The solid product is returned to the process.

In treating a crude salt mixture containing, for example, approximately thirty percent (30%) potassium chloride and the balance essentially sodium chloride in a concentration treatment of the type described in my said copending application, a potassium chloride concentrate is produced as a froth. Briefly, the more general and important features of such a method are as follows: The crude salt mixture enters the ball mill where it is mixed with a sufficient amount of brine saturated in respect to the component salts, to produce a pulp containing, for example, approximately sixty-five percent (65%) solids. The salts are preferably ground to separate part of the sodium chloride and potassium chloride particles without overgrinding, and a considerable portion of the salts are insufficiently ground. The ground salts are suitably separated into undersize and oversize portions as by screening, for example, on an 8-mesh screen, the oversize being returned to the ball mill and the undersize admixed with brine being passed to a pulp box where sufficient additional brine is added to form a pulp containing, for example, approximately forty percent (40%) solids. This pulp is subjected to flotation with the addition of collector and frother reagents which promote the selective flotation of one of the chlorides, particularly potassium chloride. The resulting tails from the flotation cells are of varying sizes, rich in sodium chloride and poor in potassium chloride and are screened on a suitable screen, for example, one of about 30-mesh, the oversize being returned to the ball mill and the undersize together with the brine being sent to a thickener and then filtered.

In an operation of the type illustrated in the flow sheet, the filtered tails are mixed with a sufficient amount of water to form a pulp which the pump can handle easily. This amount of water will dissolve all of the potassium chloride, but there is insufficient potassium chloride present to make the resultant brine saturated in respect to potassium chloride. It does, however, become saturated in respect to sodium chloride. After the undissolved salt together with resultant brine has been pumped to the tails pond, the undissolved salt settles out and the free brine drains away from the salt. This brine is saturated in respect to sodium chloride and perhaps plus or minus one-fifth saturated in respect to potassium chloride.

This brine is returned for the further repulping of the salt from the tails filter. Since the brine is not saturated in respect to potassium chloride, it dissolves an additional residual portion of potassium chloride from the tails filter discharge, but dissolves no further sodium chloride. The pulp is again pumped to the tails pond and the waste salt settled out. The resultant brine is now perhaps two-fifths saturated in respect to potassium chloride.

This cycle is repeated until the brine becomes completely saturated in respect to both potassium and sodium chlorides. Thus by continuing the cycle, I recover the residual potassium chloride left in the mill tails as a brine saturated in respect to both sodium and potassium chlorides.

This brine is then evaporated to produce a crude salt, which will run about thirty percent (30%) potassium chloride and about seventy percent (70%) sodium chloride. The crude salts are then run through the flotation apparatus along with the fresh feed.

I claim:

1. In a method of separating potassium chloride and sodium chloride from crude salt mixtures, the improvement which comprises grinding in a saturated salt solution the crude salt mixture only sufficiently to separate in part the potassium chloride and sodium chloride particles to minimize pulverization leaving a considerable portion of the crude salt insufficiently ground, screening the ground mixture through a coarse screen of about 8 mesh to remove the large particles which are returned to the grinding operation, subjecting the particles which pass through the screen to a flotation treatment to produce a potassium chloride-rich froth and a tails rich in sodium chloride but containing considerable potassium chloride, screening the tails and returning the particles on the screen to the grinding operation, subjecting the particles of the tails which pass through the screen to repeated washings with the same water until the potassium chloride is dissolved and the water becomes saturated with sodium chloride and contains a considerable amount of potassium chloride, separating the saturated solution from the remaining solid sodium chloride, evaporating the saturated solution to recover the dissolved sodium chloride and potassium chloride and returning the recovered mixture of sodium chloride and potassium chloride to the process.

2. In a method of separating potassium chloride and sodium chloride from crude salt mixtures, the improvement which comprises grinding in a saturated salt solution the crude salt mixture only sufficiently to separate in part the potassium chloride and sodium chloride particles to minimize pulverization leaving a considerable portion of the crude salt insufficiently ground, screening the ground mixture through a coarse screen of about 8 mesh to remove the large particles which are returned to the grinding operation, subjecting the particles which pass through the screen to a flotation treatment to produce a potassium chloride-rich froth and a tails rich in sodium chloride but containing considerable potassium chloride, screening the tails and returning the particles on the screen to the grinding operation, mixing the particles of the tails which pass through the screen in a pulping operation with water in an amount sufficient to form a pulp which may be pumped readily, pumping the pulped tails into a receptacle where the water drains off the solids, circulating the water from the receptacle over the tails until the water is saturated in respect to both potassium chloride and sodium chloride, separating the saturated solution from the remaining solid sodium chloride, evaporating the saturated solution and recovering a solid mixed salt having a similar composition to the original crude salt mixture, and returning the recovered salt to the grinding operation.

3. In a method of separating potassium chloride and sodium chloride from crude salt mixtures, the improvement which comprises grinding in a saturated salt solution the crude salt mixture only sufficiently to separate in part the potassium chloride and sodium chloride particles to minimize pulverization leaving a considerable portion of the crude salt insufficiently ground, screening the ground mixture through a coarse screen of about 8 mesh to remove the large particles which are returned to the grinding operation, subjecting the particles which pass through the screen to a flotation treatment to produce a potassium chloride-rich froth and a tails rich in sodium chloride but containing considerable potassium chloride, screening the tails on a 30 to 60 mesh screen and returning the particles retained on the screen to the grinding operation, mixing the particles of the tails which pass through the screen with fresh water in amount sufficient to form a pulp that can be pumped readily, said water being in an amount in excess of that which may be saturated with potassium chloride in the said mixing, separating a solution saturated with sodium chloride and unsaturated with potassium chloride from the remaining solid sodium chloride, subjecting another portion of tails to mixing with said solution from the first-mentioned mixing, repeating the mixing of the said solution with succeeding portions of screened tails until a solution is obtained which is saturated in respect to sodium chloride and almost saturated with potassium chloride, evaporating the solution of potassium chloride and sodium chloride to obtain a solid product containing potassium chloride and sodium chloride, and returning the solid product to the process.

4. In a method of separating potassium chloride and sodium chloride from crude salt mixtures, the improvement which comprises grinding in a saturated salt solution the crude salt mixture only sufficiently to separate in part the potassium chloride and sodium chloride particles to minimize pulverization leaving a considerable portion of the crude salt insufficiently ground, screening the ground mixture through a coarse screen of about 8 mesh to remove the large particles which are returned to the grinding operation, subjecting the particles which pass through the screen to a flotation treatment to produce a potassium chloride-rich froth and a tails rich in sodium chloride but containing considerable potassium chloride, screening the tails through a 30 to 60 mesh screen and returning the retained particles on the screen to the grinding operation, subjecting the particles which pass through the screen to repeated washings with the same water until the potassium chloride is dissolved, said solution becoming saturated with sodium chloride and from almost completely saturated to completely saturated with potassium chloride, and evaporating the solution to recover the potassium chloride and the sodium chloride.

LOCKWOOD W. FERRIS.